(12) United States Patent
Nishide (10) Patent No.: US 7,864,223 B2
(45) Date of Patent: Jan. 4, 2011

(54) IMAGING APPARATUS, VIDEO SIGNAL PROCESSING CIRCUIT, VIDEO SIGNAL PROCESSING METHOD AND COMPUTER PROGRAM PRODUCT FOR CONVERTING A COLOR IMAGE

(75) Inventor: Yoshiaki Nishide, Osaka (JP)

(73) Assignee: Sony Corporation, Tokyo (JP)

( * ) Notice: Subject to any disclaimer, the term of this patent is extended or adjusted under 35 U.S.C. 154(b) by 831 days.

(21) Appl. No.: 11/728,533

(22) Filed: Mar. 26, 2007

(65) Prior Publication Data

US 2007/0229682 A1    Oct. 4, 2007

(30) Foreign Application Priority Data

Mar. 28, 2006 (JP) .......................... P2006-088735

(51) Int. Cl.
*H04N 5/235* (2006.01)
(52) U.S. Cl. .................................... 348/229.1; 348/255
(58) Field of Classification Search ................. 348/239, 348/255, 229.1
See application file for complete search history.

(56) References Cited

U.S. PATENT DOCUMENTS

| 4,633,301 A * | 12/1986 | Saitoh .......................... 358/516 |
|---|---|---|
| 5,241,373 A * | 8/1993 | Kanamori et al. ............ 348/645 |
| 5,512,948 A * | 4/1996 | Iwamatsu .................... 348/255 |
| 6,271,891 B1 * | 8/2001 | Ogawa et al. ................ 348/674 |
| 7,180,541 B2 * | 2/2007 | Kinjo .......................... 348/239 |
| 2003/0081954 A1 * | 5/2003 | Niikawa et al. .............. 396/429 |
| 2004/0240003 A1 * | 12/2004 | Sakakibara .................. 358/505 |

FOREIGN PATENT DOCUMENTS

| JP | 4 255193 | 9/1992 |
|---|---|---|
| JP | 5 292521 | 11/1993 |
| JP | 11 341511 | 12/1999 |
| JP | 2000 105820 | 4/2000 |
| JP | 2001 216505 | 8/2001 |
| JP | 2003 87814 | 3/2003 |
| JP | 2003 134520 | 5/2003 |

* cited by examiner

*Primary Examiner*—John M Villecco
*Assistant Examiner*—Kent Wang
(74) *Attorney, Agent, or Firm*—Frommer Lawrence & Haug LLP; William S. Frommer; Thomas F. Presson

(57) ABSTRACT

A video signal processing circuit converting a color image represented using a plurality of primary color signals into a monocolor image is provided. The video signal processing circuit includes: a chroma adjustment unit adjusting the chroma of the plurality of input primary color signals; a gain correction unit provided for each of the primary color signals, correcting gain on the primary color signals whose chroma is adjusted in the chroma adjustment unit; and a control unit instructing the chroma adjustment unit to adjust the chroma and instructing each of the gain correction units to correct the gain.

6 Claims, 7 Drawing Sheets

IMAGING APPARATUS, VIDEO SIGNAL PROCESSING CIRCUIT, VIDEO SIGNAL PROCESSING METHOD AND COMPUTER PROGRAM PRODUCT FOR CONVERTING A COLOR IMAGE

CROSS REFERENCES TO RELATED APPLICATIONS

The present invention contains subject matter related to Japanese Patent Application JP 2006-088735 filed in the Japanese Patent Office on Mar. 28, 2006, the entire contents of which being incorporated herein by reference.

BACKGROUND OF THE INVENTION

1. Field of the Invention

The present invention relates to a video signal processing circuit for converting a color image into a monocolor image in which a specific color is adjusted to desired chroma, an imaging apparatus including the video signal processing circuit, a video signal processing method and a computer program product.

2. Description of the Related Art

There have been known several methods for changing a color image captured with an imaging apparatus such as a video camera into the image of a certain color tone. For example, monocolor processing has been typically used for video cameras as a method of representing an image as if the image was captured using a monotone film. Particularly, a function of changing a captured image into the image of a sepia tone as if the image was captured using a film is included in various imaging apparatuses.

Japanese Unexamined Patent Application Publication No. 2000-105820 discloses a method of generating a monotone image, for example. This method includes the steps of acquiring distribution of luminance equivalent values of respective pixels constituting an image, deriving a corresponding relationship in luminance conversion if any improvement is allowed in the luminance distribution, and generating a monotone image having luminance of the pixels converted based on the corresponding relationship.

SUMMARY OF THE INVENTION

Figure 1:
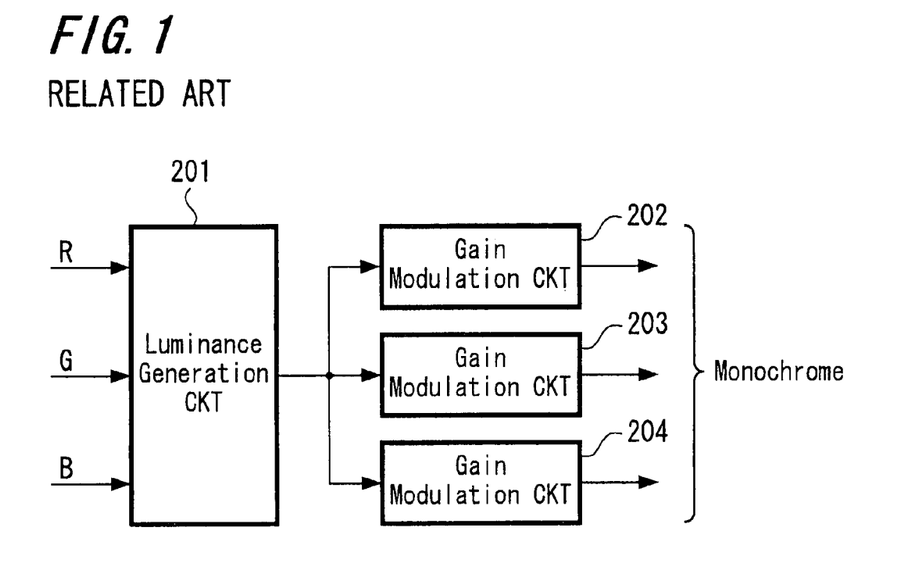
FIG. 1 is a diagram illustrating monocolor processing in related art.

FIG. 1 shows monocolor processing typically performed in related art, in which primary color signals of red (R), green (G) and blue (B) obtained by using image sensors are input into a luminance generation circuit 201 to calculate luminance signals, and gain on each color is applied to the luminance signals in gain modulation circuits 202, 203 and 204. Though a circuit configuration is comparatively simplified, colors may remain when the luminance is saturated. There, on the contrary, may be another processing of controlling such luminance saturation; however, it is basically difficult to determine the representation of an image when luminance being saturated. For example, it is difficult to determine whether a white portion in the original image before the monocolor processing is represented also in white after the monocolor processing or represented in sepia. In such case, a color tone of monocolor images is determined by manufacturers manufacturing imaging apparatuses, and therefore users have limited flexibility in adjusting the color tone.

In addition, there is a method of mixing original signals with the signals on which monocolor processing is performed as typical monocolor processing, in the case of obtaining such representation as using a faded film; however, there is a possibility that color still remains on the saturated signals in such processing, which is not preferable for users.

It is desirable to perform highly flexible color tone adjustment processing on color images.

According to an embodiment of the present invention, in the case where a color image represented with a plurality of primary color signals is converted into a monocolor image, saturation is first adjusted on the plurality of primary color signals based on instructions supplied from an operation unit or the like, and subsequently, gain correction indicated to each of the primary colors is performed on the saturation-adjusted primary color signals.

Monocolor images described herein include a monochrome image having gradation of black and white, a monocolor image of single color with saturation adjusted, and further an image made of a plurality of colors.

With the above-described configuration, since saturation of each of the primary color signals is first adjusted and afterward the gain correction is performed on each of the saturation-adjusted primary color signals, a color tone can independently be adjusted on each color.

According to an embodiment of the present invention, highly flexible color tone adjustment processing can be performed on color images.

DESCRIPTION OF THE PREFERRED EMBODIMENTS

Preferred embodiments of the present invention are hereinafter described with reference to accompanied drawings. It should be noted that herein "monocolor processing" refers to processing of converting a ordinary color image into a monocolor image.

Figure 2:
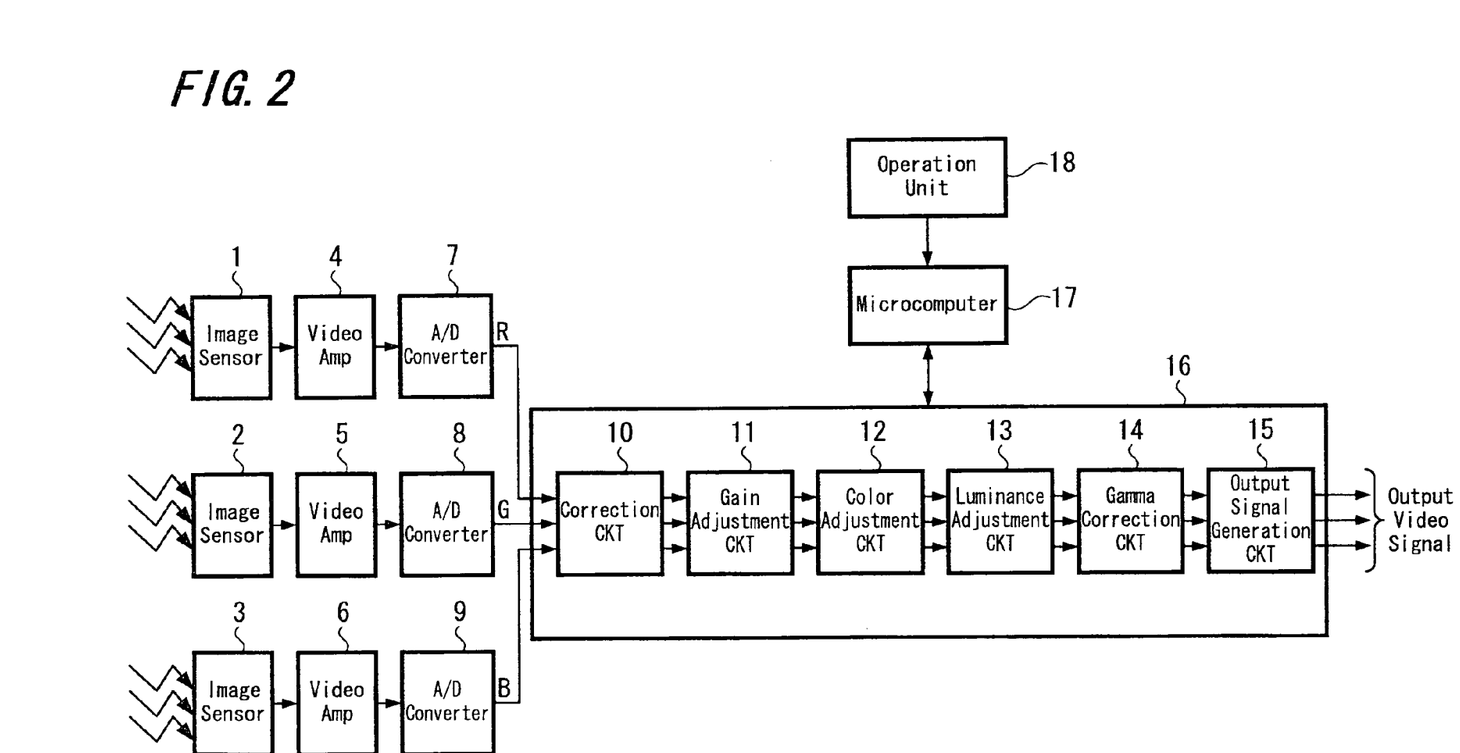
FIG. 2 is a block diagram showing an example of configuration of a video camera according to an embodiment of the present invention.

FIG. 2 is a block diagram showing a basic configuration of a video camera to which an imaging apparatus according to an embodiment of the present invention is applied. Filters to resolve an optical image captured by a lens (not illustrated) into three primary color images of red (R), green (G) and blue (B) are mounted in the video camera shown in FIG. 2 prior to three image sensors 1, 2 and 3, each of which includes an imaging device using CCD (Charge Coupled Device) and the like. Subject image light is incident on light receiving portions of the image sensors 1, 2 and 3 via the filters after passing through an optical system such as a lens not illustrated, and a photoelectric conversion is performed on red, green and blue images, separately. Although three image sensors for red, green and blue are provided in this embodiment, it should be appreciated that image sensors corresponding to, for example, four colors may be provided without limiting to this embodiment.

The image sensors 1, 2 and 3 perform the photoelectric conversion and generate primary color signals forming video signals from the subject image, respectively, and subsequently supply the three primary color signals (signal R, signal G and signal B) to video amplifiers 4, 5 and 6, respectively. It should be noted that the above-described video signals can be applied to a still image, as well as a moving image.

The video amplifiers 4, 5 and 6 are gain adjusters, and AGC (Automatic Gain Control) circuits or the like can be applied, for example. The video amplifiers 4, 5 and 6 adjust gains of the primary color signals, and supply the gain-adjusted primary color signals to A/D converters 7, 8 and 9, respectively. The A/D converters 7, 8 and 9 convert input analog signals into digital signals supplied to a video signal processing unit 16.

The video signal processing unit 16 according to this embodiment includes a correction circuit 10, a gain adjustment circuit 11, a color adjustment circuit 12, a luminance adjustment circuit 13, a gamma correction circuit 14 and an output signal generation circuit 15. First, the primary color signals R, G and B adjusted and quantized to appropriate levels by using the above-described video amplifiers 4, 5, 6 and A/D converters 7, 8, 9 are input into the correction circuit 10 in the video signal processing unit 16.

The correction circuit 10 performs signal processing such as predetermined interpolation processing with filter processing and shading processing on the input three primary color signals supplied to the gain adjustment circuit 11.

The gain adjustment circuit 11 adjusts gains of the three primary color signals input from the correction circuit 10 to appropriate levels, and supplies the adjusted three primary color signals to the color adjustment circuit 12.

The color adjustment circuit 12 is a video signal processing circuit according to an embodiment of the present invention, adjusting (correcting) color tones of the three primary color signals input from the gain adjustment circuit 11 to desired color tones, and supplying the adjusted three primary color signals to the luminance adjustment circuit 13.

The luminance adjustment circuit 13 extracts luminance signals from the primary color signals input from the color adjustment circuit 12 so that video signals fall in a predetermined range, controls an amplitude characteristic of the luminance signals in a high-luminance region to narrow a dynamic range of the output from each image sensor, and supplies the luminance signals to the gamma correction circuit 14.

The gamma correction circuit 14 performs correction corresponding to a gamma characteristic of a monitor (receiver) such as CRT (Cathode Ray Tube) on each of the three primary color signals input from the luminance adjustment circuit 13, and supplies the gamma-corrected primary color signals to the output signal generation circuit 15.

The output signal generation circuit 15 converts the three primary color signals input from the gamma correction circuit 14 into an ultimate video-signal output format and outputs the converted primary color signals to the outside. For example, the output signal generation circuit 15 has a function of serving as an encoder converting the three primary color signals into color-difference signals and modulating the color-difference signals by using sub-carrier signals (not illustrated) to conform to NTSC (National Television System Committee) standard, PAL (Phase Alternating Line) standard, or the like. Further, in the case where video signals should be output as analogue signals, the output signal generation circuit 15 includes a D/A converter that converts quantized color-difference signals output from the above-described encoder circuit into analogue signals.

A microcomputer 17 is an example of a control unit that controls respective circuits constituting the video signal processing unit 16. Further, the microcomputer 17 controls operation of an optical system such as a lens (not illustrated) and operations of the video amplifiers 4, 5 and 6. An operation unit 18 includes button keys provided on the video camera, soft keys allocated to icons displayed on a monitor screen mounted on the video camera, and the like, inputting an operation signal corresponding to such operation to the microcomputer 17 from the operation unit 18 via an interface not illustrated. The microcomputer 17 performs predetermined operations and control on each circuit using a computer program stored in a non-volatile memory unit such as an internal ROM (Read Only Memory) based on an operation signal input by a user operating the operation unit 18, or based on predetermined settings defined in advance and the like.

Further, the microcomputer 17 connects to a drive circuit (not illustrated) according to need, and reads computer programs from a magnetic disk, optical disk, magneto-optical disk, semiconductor memory, or the like suitably mounted thereto and installs the programs in RAM incorporated in the microcomputer 17 as needed.

As described above, photoelectric conversion is performed on a subject image in the image sensors 1, 2 and 3 to generate primary color signals of red (R), green (G) and blue (B), subsequently, the generated primary color signals are adjusted and quantized to analogue signals at appropriate levels, and converted into digital signals using the video amplifiers 4, 5, 6 and A/D converters 7, 8, 9 in the video camera. Appropriate correction and gain adjustment processing are performed on each of the quantized primary color signals in the correction circuit 10 and gain adjustment circuit 11, and subsequently, each primary color signal is input into the color adjustment circuit 12. Each of the primary color signals input into the color adjustment circuit 12 is adjusted to a desired color tone based on an instruction supplied from the microcomputer 17 and is input into the luminance adjustment circuit 13. Further, appropriate luminance reduction processing is performed in the luminance adjustment circuit 13 on each of the primary color signals, and afterward, the signals are input into the gamma correction circuit 14. The gamma-corrected primary color signals are converted into signals of the ultimate video signal output format to be output from the output signal generation circuit 15.

Figure 3:
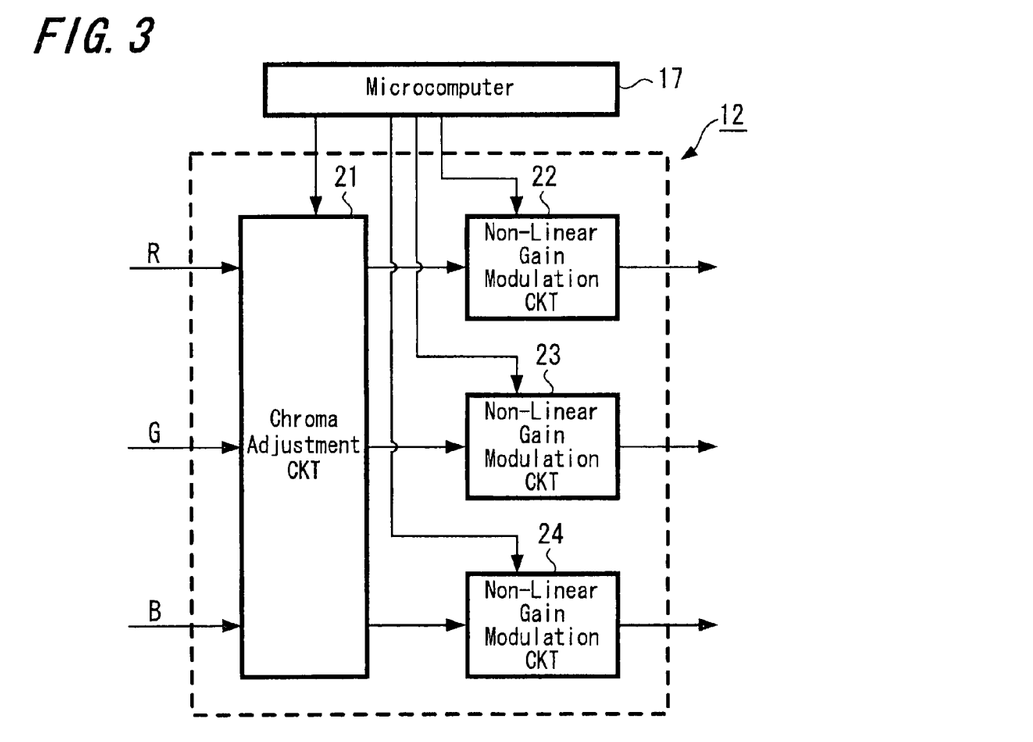
FIG. 3 is a diagram showing an example of configuration of a color adjustment circuit of the video camera shown in FIG. 2.

The color adjustment circuit 12 is described in detail. FIG. 3 shows an example of configuration of the color adjustment circuit 12. The color adjustment circuit 12 according to this embodiment includes a chroma adjustment circuit 21, a non-linear gain modulation circuit 22 for signal R (channel R), a non-linear gain modulation circuit 23 for signal G (channel G) and a non-linear gain modulation circuit 24 for signal B (channel B). The color adjustment circuit 12 performs the non-linear operation separately on the video signals each having different color information, in other words, on the primary color signals R, G, and B having adjusted chroma (also called saturation).

The chroma adjustment circuit 21 is an example of a chroma adjustment unit adjusting the chroma of the input primary color signals based on the instruction supplied from the microcomputer 17, and outputting the primary color signals to the corresponding non-linear gain modulation circuits 22, 23 and 24, respectively.

The non-linear gain modulation circuits 22, 23 and 24 are examples of gain adjustment units that correct the gain on the input primary color signals using a gain modulation pattern (correction pattern) determined by the instruction supplied from the microcomputer 17, and the corrected primary color signals are output. Gain correction is performed by non-linear processing in this embodiment.

Upon inputting the primary color signals R, G and B into the chroma adjustment circuit 21 from the gain adjustment circuit 11 (see FIG. 2) in the color adjustment circuit 12, the chroma adjustment circuit 21 adjusts the chroma of the primary color signals based on the instruction supplied from the microcomputer 17, and supplies the chroma-adjusted primary color signals to the corresponding non-linear gain modulation circuits 22, 23 and 24, respectively. Each of the non-linear gain modulation circuits 22, 23 and 24 performs the non-linear processing to obtain a desired gain on each of the chroma-adjusted primary color signals by referring to the gain modulation pattern, and outputs the resultant signals to the subsequent luminance adjustment circuit 13 (see FIG. 2). It should be noted that there may be a color (primary color signal) on which the non-linear processing is not performed depending on gain modulation patterns.

Figure 4:
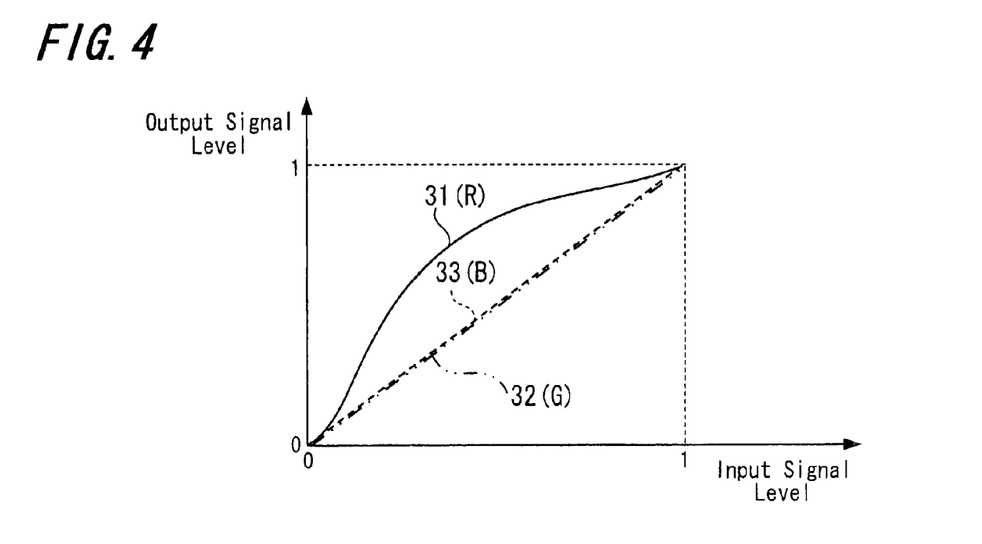
FIG. 4 is a diagram showing an example of non-linear gain curves (1) according to an embodiment of the present invention.

Thus, the chroma is adjusted on the input three primary color signals in the chroma adjustment circuit 21, and subsequently, the non-linear processing is performed separately on respective primary color signals R, G and B in the non-linear gain modulation circuits 22, 23 and 24 in the color adjustment circuit 12. FIG. 4 shows an example of a gain modulation pattern that is referred to when the non-linear gain modulation circuits perform the non-linear processing.

As shown in FIG. 4, a horizontal axis indicates a signal level (luminance level) of a primary color signal input into the color adjustment circuit 12, and a vertical axis indicates a signal level of the primary color signal after the gain adjustment. "0" represents the signal level of 0%, which is black, and "1" represents the signal level of 100%, which is white in this example. Signal levels in the range of "0" to "1" can be represented, for example, with 256 values using 8-bit information.

A curve 31 indicates a relationship between the input signal level and output signal level of the signal R; a curve 32 indicates a relationship between the input signal level and output signal level of the signal G; and a curve 33 indicates a relationship between the input signal level and output signal level of the signal B. The example shown in FIG. 4 represents a gain adjustment pattern in which only the channel R is emphasized without performing the non-linear processing on the channels G and B. Although the curves (straight lines in actuality) 32 and 33 are identical, those two curves are slightly differed for the convenience of explanation.

As shown in FIG. 4, the non-linear processing is performed on each of the chroma-adjusted primary color signals separately in the color adjustment circuit 12. Accordingly, the gain of the channel R can be emphasized in an intermediate range, while retaining the input signal states in the vicinity of black and white, that is, the signal levels "0" and "1". In other words, the monocolor representation only using red can be obtained.

Figure 5:
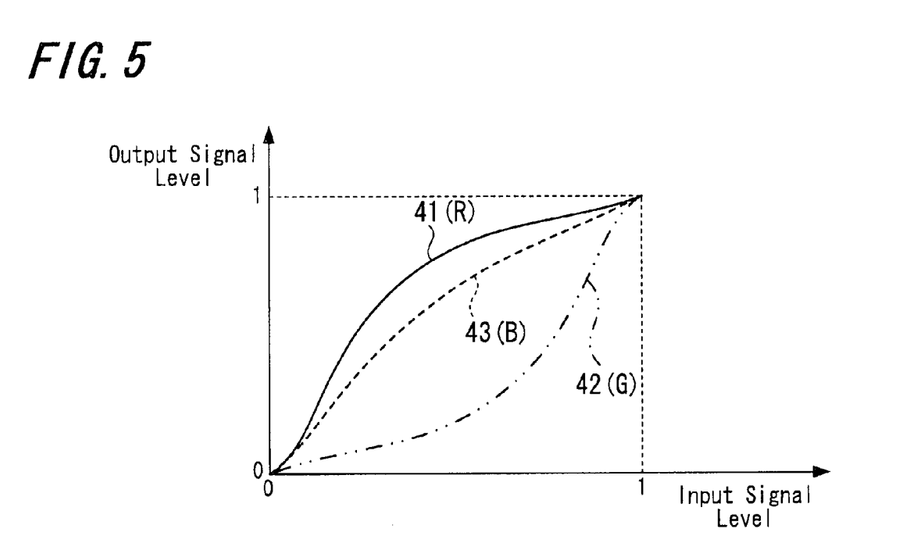
FIG. 5 is a diagram showing an example of non-linear gain curves (2) according to an embodiment of the present invention.

With the application of such function performed by the color adjustment circuit 12, the microcomputer 17 sets a non-linear gain modulation pattern shown in FIG. 5, for example, thereby enabling representation of various colors to be obtained with more flexibility. As shown in FIG. 5, a curve 41 indicates the relationship between the input signal level and output signal level of the signal R; a curve 42 indicates the relationship between the input signal level and output signal level of the signal G; and a curve 43 indicates the relationship between the input signal level and output signal level of the signal B. The example shown in FIG. 5 represents a gain adjustment pattern in which only the channels R and B are emphasized while the channel G is controlled, and particularly, the channel R is emphasized in this pattern.

Applying the above-described non-linear gain adjustment processing to primary color signals with chroma controlled to the extent of about one-severalth in the chroma adjustment circuit 21, such representation as a faded picture with dark red and light green can be obtained.

Furthermore, black-and-white monochrome representation can also be obtained by almost eliminating the chroma in the chroma adjustment circuit 21.

Figure 6:
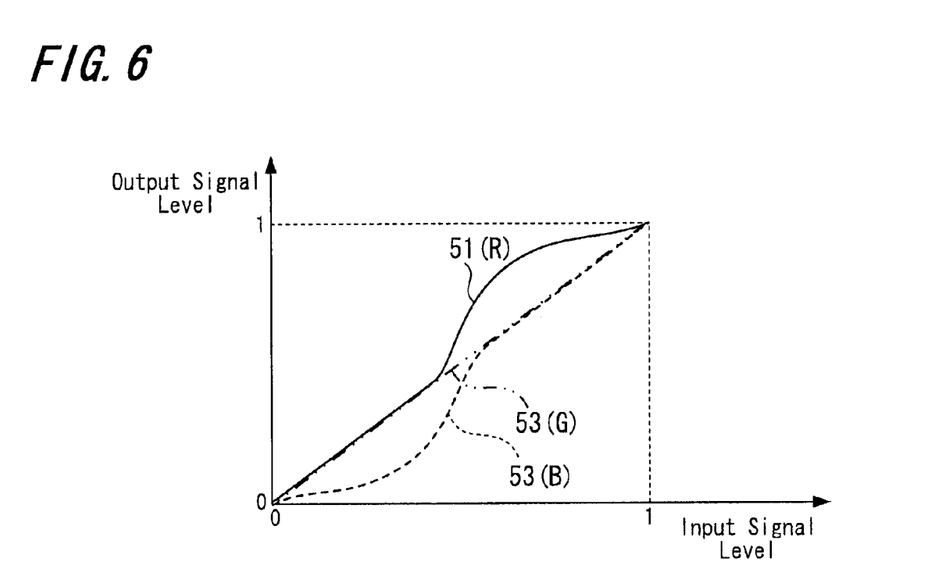
FIG. 6 is a diagram showing an example of non-linear gain curves (3) according to an embodiment of the present invention.

FIGS. 4 and 5 are diagrams showing examples of the gain modulation patterns in which the same color is represented over the whole image. However, such image representation that the color changes depending on the input signal level can be obtained using a gain modulation curve with the channel R emphasized at a higher level of the input signal and the channel B on the contrary emphasized at a lower level thereof, for example. FIG. 6 shows an example of the gain modulation pattern to obtain such image representation.

As shown in FIG. 6, a curve 51 indicates the relationship between the input signal level and output signal level of the signal R; a curve 52 indicates the relationship between the input signal level and output signal level of the signal G; and a curve 53 shows the relationship between the input signal level and output signal level of the signal B. The example shown in FIG. 6 represents a gain adjustment pattern in which the gain modulation curve 51 for the channel R rises only at a higher level and on the contrary the gain modulation curve 53 for channel B drops only at a lower level. With the non-linear processing being performed using such gain modulation pattern, a dark portion of the image includes output signals that the channel B (blue) is controlled and a light portion thereof includes output signals that the channel R (red) is dominant.

As described in the above example, the non-linear processing in the non-linear gain modulation circuits is varied corresponding to the level of the input primary color signals. Accordingly, an image having different color intensities depending on the level of the primary color signals can be output to a subsequent circuit.

As described above, adjustment of the chroma of primary color signals in the color adjustment circuit 12 is followed by the non-linear operation performed on the chroma-adjusted primary color signals for respective colors, causing highly flexible color tone adjustment processing to be obtained.

Specifically, upon inputting an operation signal into the microcomputer 17 by the user operating the operation unit 18, the microcomputer 17 outputs the chroma adjustment instruction and gain modulation instruction corresponding to the operation by the user to the chroma adjustment circuit 21 and non-linear gain modulation circuits 22, 23 and 24. Further, each of the primary color signals is adjusted to a desired chroma in the chroma adjustment circuit 21 based on the instruction supplied from the microcomputer 17, and afterward, the non-linear processing is performed separately on respective primary color signals in the non-linear gain modulation circuits 22, 23 and 24 based on the instruction supplied from the microcomputer 17, thereby providing image representation desirable for the user.

Here, a gain modulation pattern corresponding to a display mode such as "sepia" set as default in the video camera may be edited into a color tone preferable for the user, and the gain modulation pattern may be stored in a non-linear table described later. As a result, when the user selects, for example, the "sepia" mode by operating the soft key on the monitor, the edited gain modulation pattern corresponding to the "sepia" is selected, and the image adjusted to the desired "sepia" tone is represented. Further, the user may operate the operation unit 18 to perform a real time color-tone adjustment operation on each of the primary color signals for the image displayed on the monitor.

Curve fitting using a curve, broken line approximation using straight lines, and the like are used as methods for obtaining a circuit to perform such non-linear processing; however, a circuit configuration tends to be large in any of the methods, in order to keep the accuracy within an appropriate range. Therefore, there is proposed a method of performing the gain modulation processing in the gamma correction circuit 14 that is also a non-linear operation circuit. The gamma correction processing circuit using the broken line approximation is hereinafter described as an example, with reference to FIGS. 7 to 10.

Figure 8:
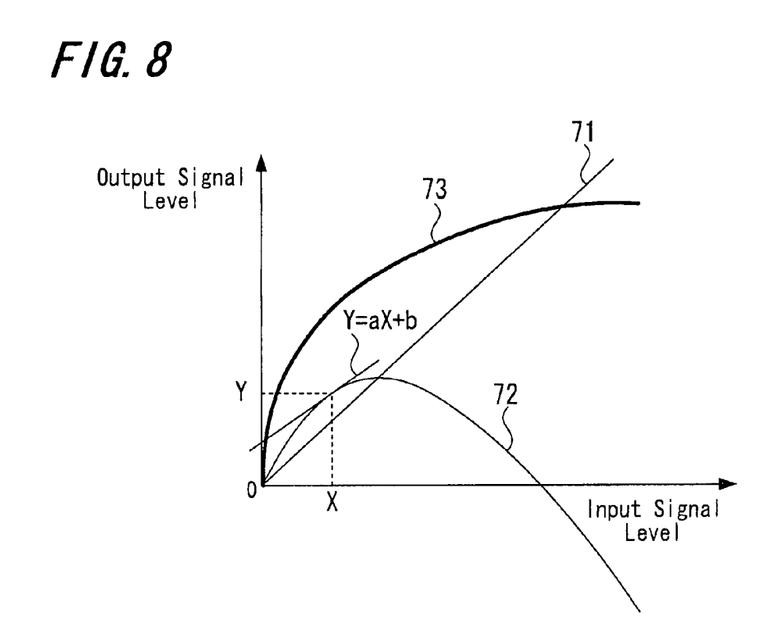
FIG. 8 is a diagram showing an example of gamma characteristics according to another embodiment of the present invention.

FIG. 8 shows the gamma correction processing based on the broken line approximation, in which a difference between a gamma value of a gamma correction curve indicated by a curve 73 and a linear characteristic value (linear value) indicated by a curve 71 is treated as a gamma correction value, and the broken line approximation is performed to obtain a non-linear curve 72 indicating an amount of level change represented by the difference. Data on respective line segments are obtained as final gamma correction values. Japanese Unexamined Patent Application Publication No. H09-172562 discloses a specific example of such gamma correction processing proposed by the applicant of this invention. Here, the contents thereof are briefly explained.

Figure 7:
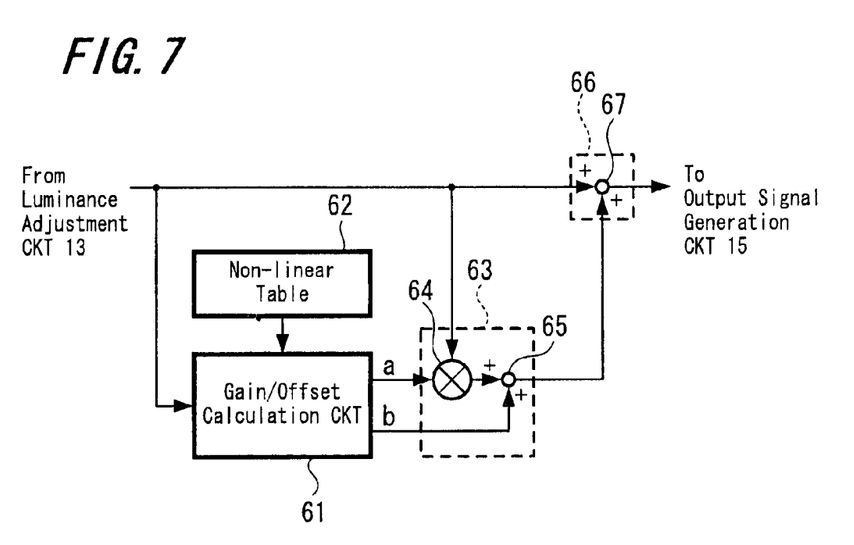
FIG. 7 is a diagram showing an example of configuration of a gamma correction circuit in the video camera shown in FIG. 2.

FIG. 7 shows an example of configuration of one channel in the gamma correction circuit 14 according to an embodiment of the present invention. As shown in FIG. 7, one channel of the gamma correction circuit includes a gain and offset calculation circuit 61, a non-linear component generation circuit 63 and a non-linear component addition circuit 66. The gamma correction circuit 14 includes the circuit having the configuration shown in FIG. 7 for each of the three channels R, G and B.

As shown in FIG. 7, a primary color signal input from the luminance adjustment circuit 13 is input into the gain and offset calculation circuit 61. The gain and offset calculation circuit 61 extracts a gain adjusting coefficient and offset amount corresponding to the input signal level from a non-linear table 62 based on the instruction supplied from the microcomputer 17.

The non-linear table 62 includes contents of non-linear processing (a range of the input signal level to which the non-linear processing is performed, and gain amount) determined by the microcomputer 17, and inclination data a and section data b of the straight line represented by a linear equation "Y=aX+b" that is tangent to the non-linear curve 72 at the time, both the contents and data being correlated. The non-linear table 62 is stored in a non-volatile memory device such as a ROM (not illustrated), and is loaded in a RAM to be referred to by the gain and offset calculation circuit 61 reading the data corresponding to the instruction. It should be noted that the non-linear table 62 is also called a mapping table or look-up table.

The gain and offset calculation circuit 61 refers to the non-linear table 62 and reads the inclination data a and section data b for each of the signal levels of the input primary color signals, supplying the inclination data a as the gain adjustment coefficient and the section data b as the offset amount to the non-linear component generation circuit 63.

The non-linear component generation circuit 63 includes a multiplier 64 and an adder 65, the multiplier 64 multiplying an input signal X by the gain coefficient a and the adder 65 adding the offset amount b to an output aX from the multiplier 64, generating a non-linear component relating to the gamma correction and supplying the generated non-linear component to the non-linear component addition circuit 66. The signals supplied from the non-linear component generation circuit 63 correspond to the curve 72 in FIG. 8.

The non-linear component addition circuit 66 includes an adder 67 adding the signal output from the non-linear component generation circuit 63 to the input signal supplied to the output signal generation circuit 15. The gamma correction processing performs such non-linear processing on the three primary color signals R, G and B.

The gain and offset amount for the input signal are calculated by referring to the non-linear table 62 in order to generate the non-linear component. Further, the calculated gain and offset amount is computed in the non-linear component generation circuit 63 to generate the non-linear component, and finally the generated non-linear component is added to the input signal (linear component) in the non-linear component addition circuit 66, thereby completing the gamma correction processing in the gamma correction circuit having the configuration described above.

Figure 9:
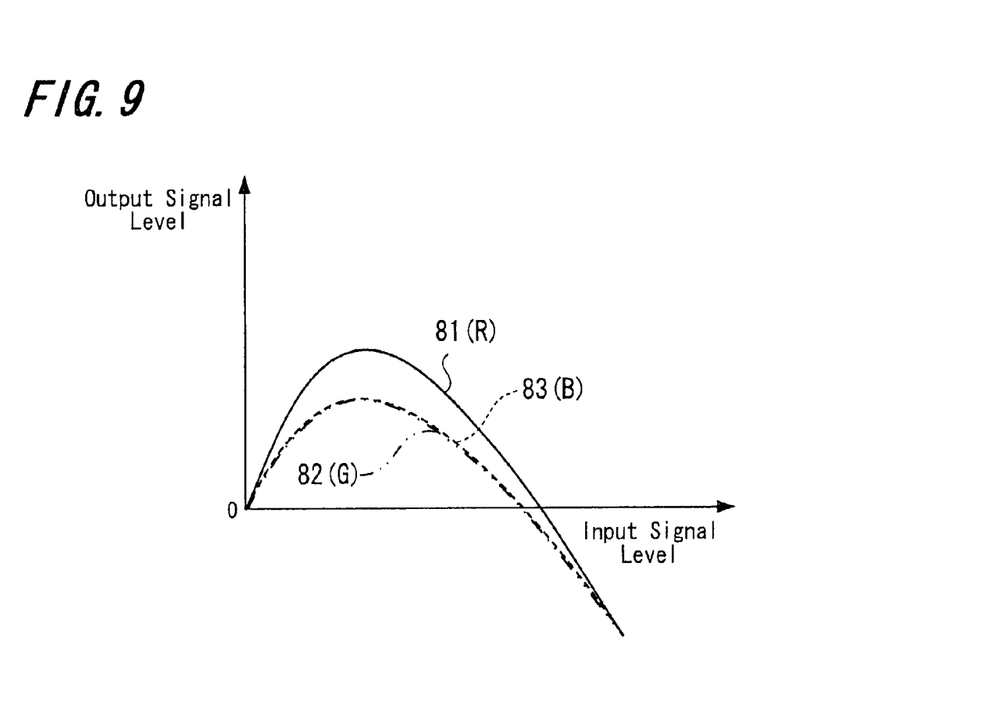
FIG. 9 is a diagram showing gain curves of non-linear component gamma characteristics according to another embodiment of the present invention.

As described above, the gamma correction circuit generates the non-linear component (curve 72) using the linear component (curve 71) of the input signal (primary color signal), and those components are added to output the gamma correction curve 73. Here, this non-linear component is observed, and different gain modulation patterns are applied to the input signals R, G and B respectively, thereby obtaining the non-linear processing according to an embodiment of the present invention. Specifically, the gain modulation patterns considered to be used in the non-linear processing according to the embodiment of the present invention are prepared for the gamma correction processing, and are stored in the non-linear table 62. Subsequently, the instruction on color tone adjustment (non-linear gain adjustment) is supplied from the microcomputer 17, and in accordance with the contents of the color tone adjustment instructed, the gain and offset calculation circuit 61 refers to the gain modulation pattern corresponding to the contents of the instruction. Further, the gain and offset calculation circuit 61 executes the non-linear processing relating to the gamma correction and color tone adjustment on each of the primary color signals based on the gain modulation pattern. FIG. 9 shows an example of the gain modulation pattern of the non-linear component.

Figure 10:
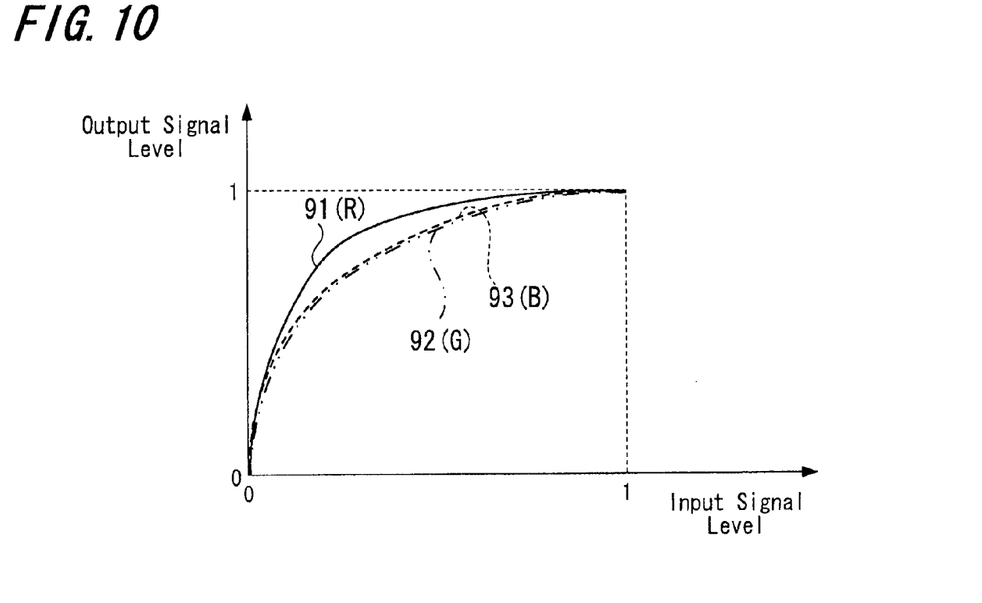
FIG. 10 is a diagram showing an example of output signals after non-linear processing according to another embodiment of the present invention.

As shown in FIG. 9, a curve 81 indicates the relationship between the input signal level and output signal level in the non-linear component of the signal R; a curve 82 indicates the relationship between the input signal level and output signal level in the non-linear component of the signal G; and a curve 83 indicates the relationship between the input signal level and output signal level in the non-linear component of the signal B. As shown in FIG. 9, the non-linear component (curve 81) of the channel R rises higher than the other channels and is emphasized in a middle range. FIG. 10 shows the final output signals obtained based on the gain curves of the non-linear components shown in FIG. 9.

As shown in FIG. 10, a curve 91 indicates the relationship between the input signal level and output signal level of the signal R; a curve 92 indicates the relationship between the input signal level and output signal level of the signal G; and a curve 93 indicates the relationship between the input signal level and output signal level of the signal B. As shown in FIG. 10, only a middle range of the channel R gamma characteristic curve 91 rises and, as a result, only the channel R can be emphasized and represented on the monitor side.

Here, in the case of obtaining the video signal processing (monocolor processing) according to an embodiment of the present invention using the gamma correction circuit as described above, an ordinary gamma characteristic (non-linear light-emitting output characteristic) is inversely converted on the monitor side. Therefore, the color representation in the actual monocolor processing is obtained by inversely converting the gain modulation pattern to be set. More specifically, the gain modulation patterns, when using the gamma correction non-linear processing circuit, are set in consideration of the gamma characteristic on the monitor side, differing from the gain modulation patterns used in the non-linear gain modulation circuits 22, 23 and 24 shown in FIG. 3.

In the case of thus using the gamma correction circuit for the video signal processing according to an embodiment of the present invention, similarly to the previous description, also highly flexible color tone adjustment processing can be performed to obtain image representation that emphasizes various colors and image representation that emphasizes different colors at the lower level and higher level of the input signal respectively by combining a plurality of colors.

Next, the chroma adjustment circuit 21 is also described in detail. There is proposed chroma adjustment processing of generating the luminance signals from the input primary color signals, adjusting gains on signals resulted from subtracting the luminance signals from the respective primary color signals, and afterward performing an operation of adding the luminance signals again.

Figure 11:
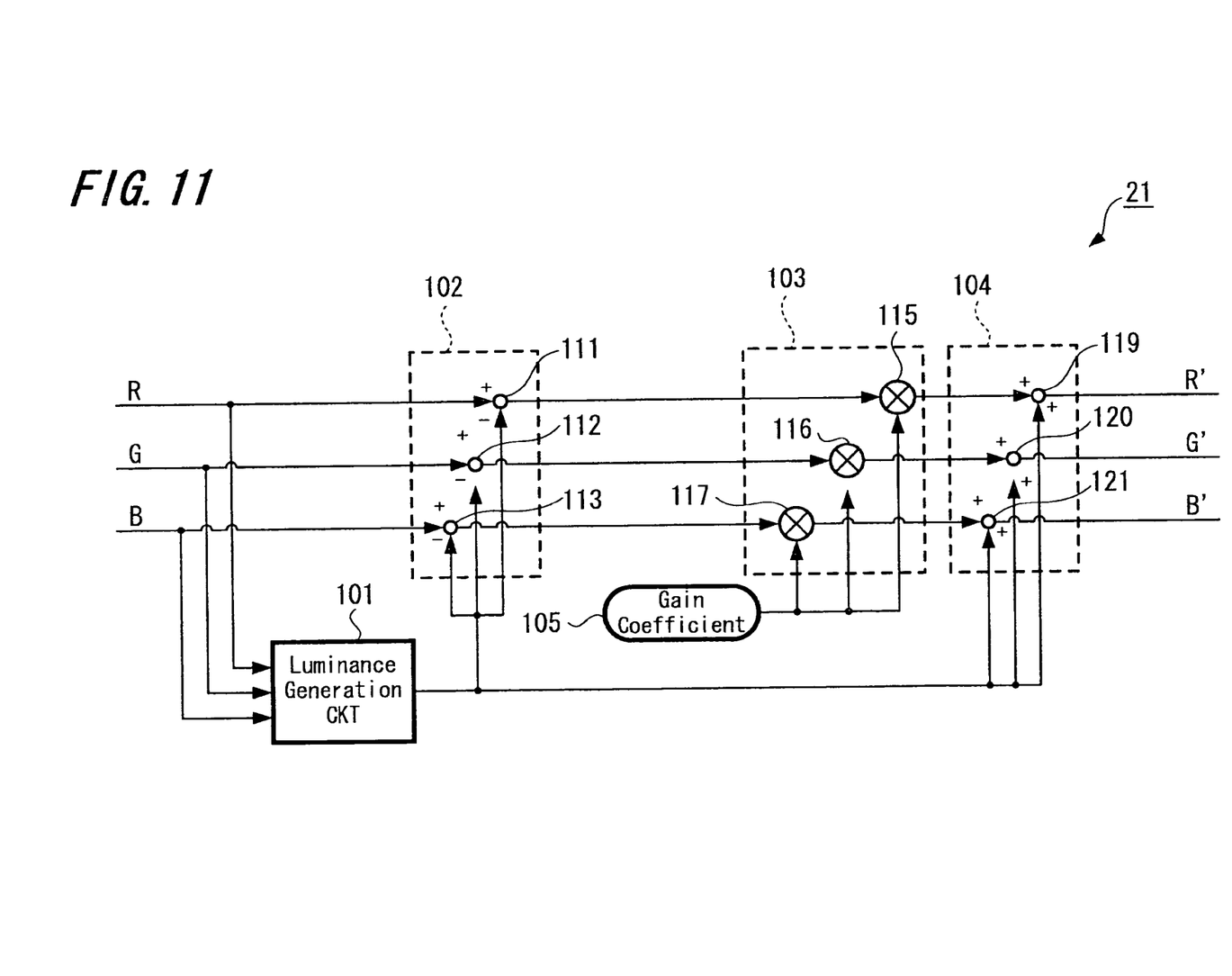
FIG. 11 is a diagram showing an example of a saturation adjustment circuit in the color adjustment circuit shown in FIG. 3.

FIG. 11 shows an example of a circuit configuration to obtain the above-described chroma adjustment processing. As shown in FIG. 11, the chroma adjustment circuit according to this embodiment includes a luminance generation circuit 101, a color difference generation circuit 102, a color difference gain adjustment circuit 103 and an output circuit 104.

The luminance generation circuit 101 uses a matrix circuit to generate the luminance signals from the primary color signals R, G and B.

The color difference generation circuit 102 performs an operation of subtracting the luminance signals generated in the luminance generation circuit 101 from the input primary color signals R, G and B, and generating the color difference signals.

The color difference gain adjustment circuit 103 performs an operation of multiplying the color difference signals of respective channels generated in the color difference generation circuit 102 by a gain adjustment coefficient (k) 105 set by the microcomputer.

The output circuit 104 performs processing of adding the luminance signals generated in the luminance generation circuit 101 to respective color difference signals having the gain adjusted in the color difference gain adjustment circuit 103, outputting the resultant signals to subsequent circuits.

The luminance signals are first generated from the primary color signals R, G and B input into the luminance generation circuit 101 in the chroma adjustment circuit having the above-described configuration. The luminance signals are subtracted from respective primary color signals in the color difference generation circuit 102 to generate the color difference signals R–Y, G–Y and B–Y corresponding to the primary color signals respectively. Subsequently, each of the color difference signals is multiplied by the gain adjustment coefficient (k) in the color difference gain adjustment circuit 103 to adjust the gain. Finally, the luminance signals are again added to respective gain-adjusted color difference signals in the output circuit 104, and the video signals R', G' and B' each having the adjusted chroma and the same luminance are output to the outside.

The video signals R', G' and B' finally output from the output circuit 104 are described as follows:

$$R'=(R-Y) \times k+Y$$

$$G'=(G-Y) \times k+Y$$

$$B'=(B-Y) \times k+Y$$

In the case of the gain coefficient k being "0", for example, a monotone representation of black and white is obtained with output primary color signals. Further, in the case of the gain coefficient k being "0.5", a color tone with half the color remaining in each of the output primary color signals is obtained.

The adjustment operation itself is not particularly large in terms of volume, but having a dedicated circuit causes an increase in circuit scale of the whole video signal processing unit 16. Therefore, part of the luminance adjustment circuit 13 such as the function of extracting the luminance signal, for example, is applied to this processing, thereby enabling the processing using a known circuit to be performed similarly to the non-linear processing using the gamma correction circuit, and preventing the increase in circuit scale.

As heretofore described, an imaging apparatus such as a video camera has the configuration in which chroma of each of primary color signals R, G and B is adjusted, and afterward the non-linear operation is performed separately on each of the chroma-adjusted primary color signals. Accordingly, highly flexible color tone adjustment processing can be performed on images. Further, the monocolor expression based on black and white is also possible by completely reducing the chroma.

In addition, the luminance adjustment circuit 13 and the gamma correction circuit 14 are respectively used for or applied to the chroma adjustment function and the non-linear processing function for respective colors performed in the color adjustment circuit 12, thereby enabling the color tone adjustment processing according to an embodiment of the present invention to be performed without adding a specific circuit. Accordingly, increase in circuit scale can be controlled to a minimum.

It should be noted that the above-described processing in the video signal processing unit 16 (refer to FIG. 2) can be executed by hardware, and also can be executed by software. In the case of executing the series of processing using the software, a program code constituting the software is stored in a memory unit such as a ROM incorporated in the microcomputer 17. Particularly, in the case of executing by the software the series of video signal processing (monocolor processing) according to an embodiment of the present invention, described using FIGS. 3, 7 and 11, the video signal processing unit 16 may include an extended monocolor processing function according to an embodiment of the present invention with newly installing in the memory unit the program code to execute the processing.

It should be appreciated that the embodiments of the present invention are also implemented by providing a recording medium having a recorded program code of the software performing the above-described function according to the embodiment to a system or apparatus, and by reading and executing the program code stored in the recording medium using a computer (computing unit) in the system or apparatus.

A recording medium such as a floppy disk, hard disk, optical disk, magneto-optical disk, CD-ROM, CD-R, magnetic tape, non-volatile memory card, ROM, and the like can be used as the recording medium for supplying the program code.

Further, the function according to the above-described embodiments is obtained not only by executing the program code read by the computer, but also by executing part or all of actual processing using OS or the like operating on the computer based on an instruction of the program code.

Furthermore, an example in which an imaging apparatus according to an embodiment of the present invention is applied to the video camera is described in the above embodiments; however, an embodiment of the present invention can be widely applied to various apparatuses without limiting to the video camera, and may be applied to a digital still camera, color image scanner, or other apparatuses having an equivalent function, for example. Moreover, a receiver receiving a video signal from an imaging apparatus may have the video signal processing function according to an embodiment of the present invention, and the video signal processing, specifically, the monocolor processing, can be performed on the receiver side.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus comprising:
a video signal processing circuit converting a color image represented using a plurality of primary color signals into a monocolor image,
said video signal processing circuit including a chroma adjustment unit adjusting the chroma of the plurality of input primary color signals;
a gain correction unit provided for each of said primary color signals, correcting gain on the primary color signals whose chroma is adjusted in said chroma adjustment unit; and
a control unit instructing said chroma adjustment unit to adjust the chroma, and instructing each of said gain correction units to correct the gain,
wherein the chroma adjustment unit is configured using a luminance signal generating function of a luminance adjustment circuit included in said imaging apparatus, and
wherein the chroma adjustment unit includes:
a luminance generation circuit generating luminance signals from the plurality of input primary color signals;
a color difference generation circuit generating a color difference signal corresponding to each of the primary color signals by subtracting the luminance signal generated in said luminance generation circuit from each of the primary color signals;
a color difference gain adjustment circuit adjusting the gain on each of the primary color signals generated in said color difference generation circuit in accordance with the instruction supplied from said control unit; and
an output circuit adding said luminance signal to each of the color difference signals whose gain is adjusted in said color difference gain adjustment circuit and outputting a resultant signal.

2. An imaging apparatus according to claim 1, wherein:
said video signal processing circuit includes a memory unit to store correction patterns setting the contents of gain correction; and
said gain correction unit acquires the correction pattern, corresponding to the instruction supplied from said control unit, from said memory unit, and corrects the gain on said primary color signals based on said correction pattern.

3. An imaging apparatus according to claim 2, wherein:
said gain correction unit is configured using a gamma correction function of a gamma correction circuit included in said imaging apparatus; and
said memory unit stores correction patterns including the contents of said gamma correction and contents of said gain correction.

4. A video signal processing circuit converting a color image represented using a plurality of primary color signals into a monocolor image, comprising:
a chroma adjustment unit adjusting the chroma of the plurality of input primary color signals;
a gain correction unit provided for each of said primary color signals, correcting gain on the primary color signals whose chroma is adjusted in said chroma adjustment unit; and
a control unit instructing said chroma adjustment unit to adjust the chroma and instructing each of said gain correction units to correct the gain,
wherein the chroma adjustment unit is configured using a luminance signal generating function of a luminance adjustment circuit included in said imaging apparatus, and
wherein the chroma adjustment unit includes:
a luminance generation circuit generating luminance signals from the plurality of input primary color signals;
a color difference generation circuit generating a color difference signal corresponding to each of the primary color signals by subtracting the luminance signal generated in said luminance generation circuit from each of the primary color signals:
a color difference gain adjustment circuit adjusting the gain on each of the primary color signals generated in said color difference generation circuit in accordance with the instruction supplied from said control unit; and
an output circuit adding said luminance signal to each of the color difference signals whose gain is adjusted in said color difference gain adjustment circuit and outputting a resultant signal.

5. A video signal processing method of converting a color image represented using a plurality of primary color signals into a monocolor image, comprising the steps of:
performing chroma adjustment on the plurality of primary color signals; and performing gain correction separately on each gain of the primary color signals whose chroma is adjusted, wherein the chroma adjustment step is configured using a luminance signal, and wherein the chroma adjustment step includes:
- a luminance generation step generating luminance signals from the plurality of input primary color signals;
- a color difference generation step generating a color difference signal corresponding to each of the primary color signals by subtracting the luminance signal generated in said luminance generation step from each of the primary color signals;
- a color difference gain adjustment step adjusting the gain on each of the primary color signals generated in said color difference generation step; and
- an output step adding said luminance signal to each of the color difference signals whose gain is adjusted in said color difference gain adjustment step and outputting a resultant signal.

6. A non-transitory computer-readable medium encoded with a computer program that, when executed, causes a computer to convert a color image represented using a plurality of primary color signals into a monocolor image, the computer program comprising the steps of:

chroma adjustment processing on the plurality of primary color signals; and gain correction processing separately on each gain of the primary color signals whose chroma is adjusted, wherein the chroma adjustment step is configured using a luminance signal, and wherein the chroma adjustment step includes:
- a luminance generation step generating luminance signals from the plurality of input primary color signals;
- a color difference generation step generating a color difference signal corresponding to each of the primary color signals by subtracting the luminance signal generated in said luminance generation step from each of the primary color signals;
- a color difference gain adjustment step adjusting the gain on each of the primary color signals generated in said color difference generation step; and
- an output step adding said luminance signal to each of the color difference signals whose gain is adjusted in said color difference gain adjustment step and outputting a resultant signal.

* * * * *